Figure 1:
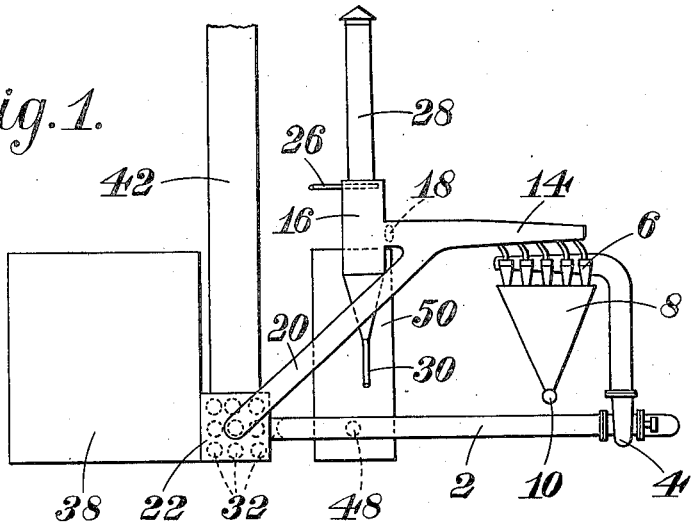

May 18, 1926.

T. RIGBY

DRYING PROCESS AND APPARATUS

Filed Feb. 13, 1922  2 Sheets-Sheet 1

1,585,511

Inventor
Thomas Rigby
by Wilkinson & Giusta
Attorneys.

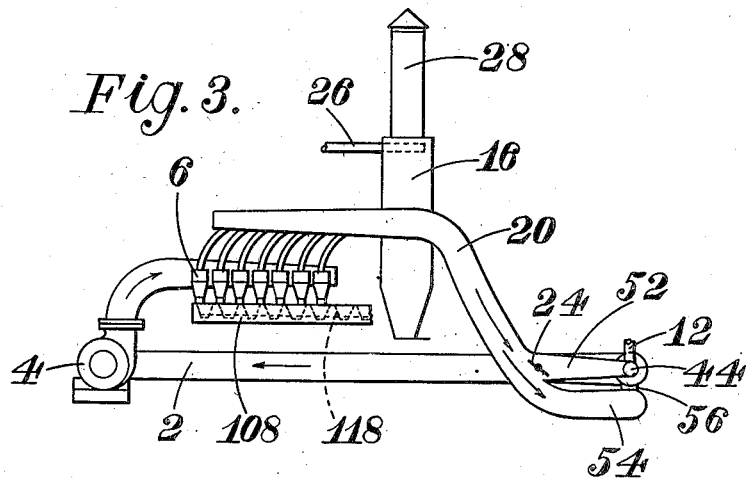
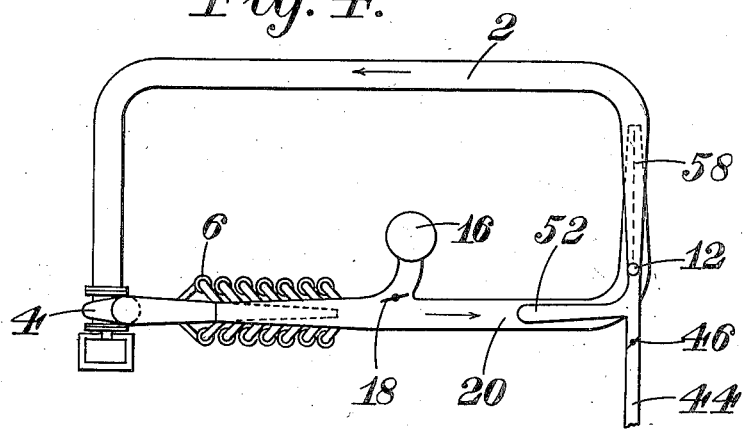
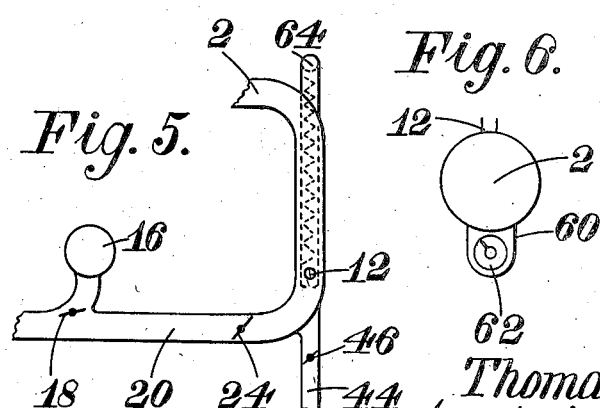

Patented May 18, 1926.

1,585,511

UNITED STATES PATENT OFFICE.

THOMAS RIGBY, OF LONDON, ENGLAND.

DRYING PROCESS AND APPARATUS.

Application filed February 13, 1922. Serial No. 536,259.

This invention relates to the drying, by the heat of a hot gaseous medium such as hot gaseous products of combustion, of combustible and other materials containing water or similar liquids.

Considering the invention in the first place and by way of example in its relation to peat drying, it has been proposed by me previously to dry peat in the gaseous products of combustion of furnaces of a peat installation, the peat in a powdered condition and containing 50% to 70% of water being dropped into flue gases leaving the boiler or other furnaces of the plant and which are travelling at a velocity of say 60 feet per second. This gaseous current carries the dust steadily, and at all events without any deliberate pause, along a long pipe to a cyclone dust separator or separators and the dust is, on its way there, dried to the desired degree by the heat of the gases which leave the drying system at a temperature which is but little above their dew point or saturation temperature. When using such a system the cyclone separators usually recover some 94% of the dust, the remaining 6% of the dust being washed out by water in washing towers or the like. When the material so removed from the gases by washing can be recovered by filtration, as in the case of wet carbonized peat which has had slimy matter of the peat destroyed by its earlier treatment in the process this is generally an economical system. When, however, the material to be handled is like raw peat which has been dehydrated merely by evaporation so that the slime content of the peat has not been removed or destroyed, the material washed out of the gases cannot be effectively recovered economically. Consequently the 6% usually lost has to be rejected and the work expended on this 6% of the material before admitting it to a cyclone drying system is wasted, apart from the loss of the material.

Further, in a peat installation of the kind in question it is convenient to use, in dust form, a portion of the dust recovered from the cyclone system for firing boilers of the factory and as the ash of peat is light and flocculent, a large proportion is carried forward with the waste gases from the boiler furnaces if no provision is made for removing it with the result that if these combustion gases are used as drying medium in a cyclone system as described the ash so carried forward is added to the peat dust deposited by the cyclone with a consequent increase in the ash content of the dried peat. This is serious if the raw peat already has a high ash content and therefore expensive dust catching arrangements are required between the boiler or other furnaces and the peat inlet of the drying system (in those cases where solid peat-fired furnaces supply the gaseous drying medium) to remove the dust before contact of the furnace gases with the peat about to be dried.

According to one feature of the present invention I substantially reduce the quantity of gaseous products of combustion which is passed from the system (in drying peat, coal, or other material by a process of the kind indicated) for a given quantitative drying action by reheating and re-using substantially the same gaseous medium in the drying system, this being effected by circulating the bulk of the medium after the same parts company with the dried material. For example, gases leaving the cyclones in a system as referred to may be conducted, in a closed system, to a heating device which may be heated by waste gases leaving boiler or other furnaces of the plant (e. g. that or those from which the gaseous heating medium is originally abstracted) which raises their temperature to the right degree by contact with properly arranged heating surfaces.

In a cyclone system as instanced the heating medium is conveniently circulated by a centrifugal fan and the velocity imparted to the gases is regulated to enable the material being dried to be as far as possible properly carried forward by the current alone without undue deposition of material under treatment in the flues. The liquid being evaporated in such a drying system will add to the volume being handled, and I can get rid of the excess volume by a suitable relief valve or orifice referred to in the example hereinafter described with reference to the drawings as a regulated relief damper, arranged on the pressure side of the fan and arranged to deal with such an increase. The fan is usually arranged immediately before the cyclones and the relief valve is preferably arranged on the exhaust side of the cyclones (e. g. between the cyclones and an adjustable damper—such as the damper 24 hereinafter described with reference to the accompanying drawings—in the circuit) which ensures the moist gases or vapour escaping at the coldest part of the system.

Further, the gaseous medium will here contain, of dust, not more than the percentage not recoverable by the cyclones and as the quantity usually escaping cyclone recovery bears some relation to the volumes (i. e. grammes of dust escaping per cubic metre) the quantity so escaping from an otherwise closed system may be brought down to a fraction of 1% of the solid matter of the dust being dried as compared with the 6% loss hereinbefore referred to. The heating medium may be heated to the required degree by means of exhaust gases from the boiler furnaces of a number thereof arranged in any suitable manner or else a portion of the gases from the middle of the boiler furnace or flue system, say at 700° C. or thereabouts, may be used either alone or in any combination or combustion gases at flame temperature may be used to effect the necessary heating of the drying medium.

Combustion gases at flame or other suitable temperature, from a specially provided furnace, may be admitted into direct contact with the gaseous drying medium to cause increase of temperature and in such an arrangement, it will be apparent that the higher the temperature of the admitted admixing gases the lesser the volume required and the lesser the volume which will have to be rejected at the relief valve in the closed system, which factors all have to be taken into account in determining under any particular conditions which proportioning is the most desirable. When combustibles are being dried naturally attention will be directed to the maintenance of gas composition inhibiting combustion but with certain of these materials (such as finely divided coal wetted say as the result of a flotation method of coal grading) there must be a concurrent attention paid to another important factor in such a drying process, namely the limitation of the gas temperature to avoid deterioration of the material being dried say by incipient distillation or fusion of bituminous components.

The quantity of dust escaping from the cyclone system will bear a ratio to the quantity of fluid so added to the drying medium and such added gases are preferably admitted to the part of the system which is on the suction side of the fan, and, conveniently before the point is reached in the circuit at which the dust to be dried is admitted to the system. It may here be pointed out that if an adjustable damper in the gaseous circuit, as referred to hereinbefore, be used, the preferable relative arrangement of the major elements of the system would be such that the damper would have on the plus pressure side of it, and between it and the cyclones, the relief valve aforementioned, and would have on its minus pressure side and between it and the inlet for the material to be dried the hot make-up gas inlet or the heating device, the fan being (as aforesaid) placed in the circuit between the inlet for the wet material and the inlet to the cyclones. With the cyclone drying system discussed above as having been previously used the specific heat of the drying medium was usually of the order of .25 whereas with a system such as that which has been instanced as according to the invention, since a larger proportion of the drying medium may be water, vapor a specific heat more nearly approaching the specific heat of steam say 0.5 is available.

As a result the weight of medium to be circulated for a given amount of drying is likely to be reduced in the same ratio so that the power absorbed by the circulating fan may be approximately reduced in the same ratio as compared with the older system.

On the other hand, this increase of specific heat may be availed of to reduce the temperature rise used in reheating the drying medium so as thereby to lessen the area of heating surface required to effect the reheating of the medium in a heat interchanger such as is hereinafter described with reference to the accompanying drawings or a compromise between these, in a sense, mutually reciprocal factors of minimum heating area and minimum fan power may evidently be set up.

It is the case that the same utilization of the heat of the exhaust gases cannot be obtained with a surface heating arrangement as with a direct contact drying system but it is expected that owing to the lesser dust loss in the substantially closed cycle and the reduced power required a great heat economy will nevertheless be obtained.

In addition, the expense of providing washing towers of large size and dust chambers behind the boilers will be considerably reduced so that the capital cost should be much less in addition to the better overall heat efficiency.

Drying on the general principle just discussed (of suspending the material to be dried in and by a hot gas current whether in part circulated as aforesaid or not) lends itself particularly well to the drying of solid low grade fuels which have been graded by wet processes and installations such as will be described hereinafter with reference to the accompanying drawings may for example be used in processes of coal utilization on the well-known flotation principle of grading.

By a drying process on such a principle low grade coal containing a high percentage of ash-yielding ingredients may be graded into fractions containing the one but little ash-yielding ingredients (and which may therefore be directly used in the production of metallurgical or other coke or for like purposes) and the other a high proportion of ash-yielding ingredients. Either or both of these fractions may be dried on the principle of suspension in and by a hot gas current to facilitate their subsequent utilization, the fraction last-mentioned containing generally too large a proportion of combustible material to admit of its rejection and it being at all events suitable generally for use in powdered-fuel burning devices for boiler firing or other purposes of power or heat generation in the plant. Where both such fractions are dried it is preferable that separate drying tube systems be used for the two fractions and the hot gas used for drying may be the products of combustion of excess coke-oven gas and/or purely waste combustion gases from boiler or other furnaces.

The requirements of efficiency in grading by the wet process may require a degree of subdivision being used at that stage which is not that best suited to the after treatment of the material. Thus it may occur that with a particular coal the high grade material separated by the flotation improves in grade as the degree of sub-division of the material treated increases from say a fineness at which it will just pass through a 10-mesh to the inch sieve to a fineness at which it will just pass through a 150-mesh to the inch sieve but that long before the finer unit is reached there is either so little gain in the percentage of the high grade product secured as the degree of fineness is increased or even so marked a diminution on this percentage that only an intermediate degree of fineness proves the most economical. On the other hand, however, powdered fuel firing may require for best results a fineness of the material such that all will pass through a sieve of 100 meshes to the inch and 85% will pass through one of 200 meshes to the inch.

Accordingly and as a feature of the invention the requisite crushing is effected by stages, the whole of the material being crushed to the fineness best for grading by the wet process and the further crushing requisite for after-treatment being effected after the grading. Usually it will be only the low grade fraction that will be required to be so treated and while owing to the added ease of suspension which comes with increasing fineness such second crushing may with advantage to the drying be effected before this step of the process. The added cost of grinding a wet product may under various circumstances render it on the whole most advantageous to defer the final crushing until after the drying and only just prior to actual combustion of the fuel in powdered fuel burners.

Figure 2:
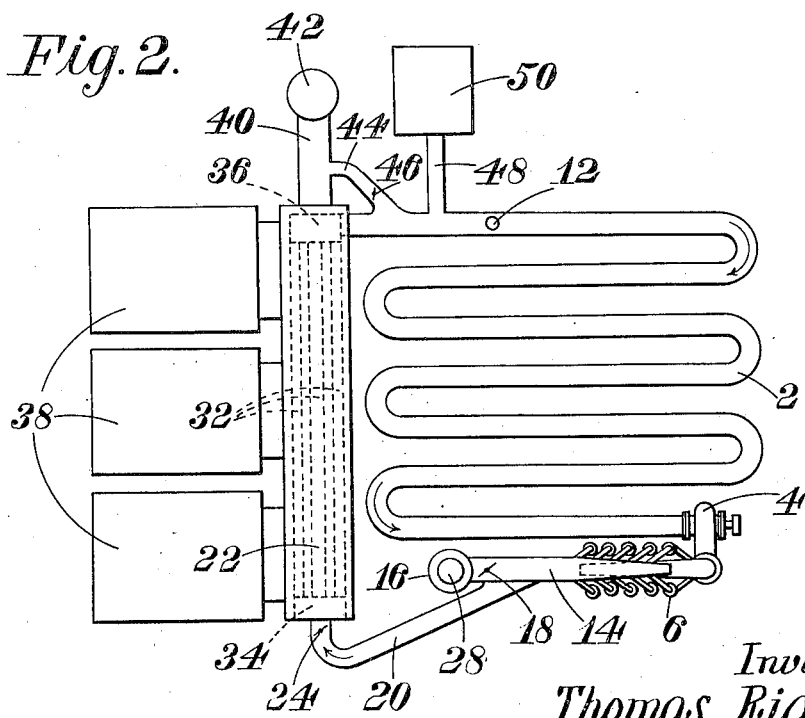

In the accompanying drawings,

Figure 1 is a diagrammatic view in elevation of one form of drying plant according to the invention, and Figure 2 is a diagrammatic plan view of the plant.

Figures 3 and 4 show diagrammatically in elevation and in plan respectively an arrangement of plant having special provision, such as may be called for when drying coal as aforesaid for dealing with any tendency of the material to deposit itself from the gas current in the course of its passage along the drying duct, Figures 5 and 6 showing respectively in plan, and on a larger scale, in sectional elevation portions of an alternative plant to that shown in Figures 3 and 4.

Figures 1 and 2 will be first considered. The drying duct of suitable length (through which the gases sweep the material at, as far as possible, a steady rate to avoid stagnation of the material, and, it may be overheating thereof) is indicated at 2, the drying gases being drawn through it by a fan 4 and impelled by the fan into a battery of cyclone dust separators 6. The dried product deposited in the separators falls into a bunker 8 from which it is withdrawn as desired through a valve indicated at 10. The material to be dried is, in an appropriate condition of sub-division, introduced into the gas current by an appropriate feed-device indicated at 12.

The gas duct 14, into which pass the gases from the cyclone separators is branched, one branch leading to a washing tower 16 and being provided with a suitably regulated relief damper 18 and the other branch 20 leading to a heater 22 and being provided with a damper 24, which can be set so as to ensure a pressure less than atmospheric being maintained in the duct at the points where the raw material is fed in and where, as hereinafter described, the make-up gas enters it.

The washing tower, the wash-water supply means of which is indicated at 26, has a chimney 28 by which the wasted gases pass away to the atmosphere and a conduit 30 leading away the slurry resulting from the washing of the escaping gases.

The heater 22 is indicated as comprising a battery of pipes 32 through which the gases pass from a chest 34 (into which the branch 20 discharges) to a chest 36 from which the drying duct 2 opens. The pipes are enclosed in a flue which receives the hot products of combustion from furnaces of a battery of boilers 38 (gases which are therefore purely waste products) providing steam for heating or power purposes or both in the installation of which the drying system under description is assumed to form part. These products of combustion after heating the gases flowing in the pipes 32 leave the flue referred to and pass by a duct 40 to the stack 42. The conduit 44 (controlled by a damper 46) connecting the duct 40 with the drying duct 2 and a duct 48 connecting a furnace 50 (provided to supply high temperature gases) furnish complementary or alternative sources of volumetric and thermal make-up for the circulating drying current of gases.

It may here be emphasized that where the hot gases available are laden with dust or other objectionable material likely to be deposited in the cyclone dust separators along with the dried material the larger the proportion of heat added to the drying current of gases by a heater such as 22, the less will be the contamination of the dried product.

Certain peculiar aspects of such a drying system will become more fully evident if its conditions of operation be contrasted with those of the older system in which all the gases passing from the cyclone dust separator would be forthwith lost to the drying system. With a peat of say a calorific value of 5,000 kilogram calories per kilogram of dry peat substance, to dry it from 30% water content to 10% water content according to said older system would theoretically require some 237 kilogram calories per kilogram of dry peat substance. If 6% of this dry substance was inevitably lost, however, by passing the cyclone separators and being irrecoverable from the slurry of the washing tower an extra heat cost of 6% of 5,000 kilogram-calories or 300 would have to be debited to the drying, giving a total drying cost, disregarding radiation and other like losses, of 537 kilogram calories per kilogram of dry substance.

Let it be supposed, however, that the amount of gases allowed to escape be, by reason of the adoption of the circulating and reheating features of the invention, cut down to one-tenth the quantity for a similar drying effect, then only 30 kilogram-calories per kilogram of peat substance will be lost in escaping dust and the figure of 537 would fall to 237 plus 30 that is to say to 267 kilogram-calories per kilogram of dry substance—a considerable heat gain in itself.

A usual temperature of the gases leaving the cyclones in this type of drying plant (in which the length of the drying duct renders close control a matter of comparative simplicity) would in the older system be say 83° C. but in a plant such as that illustrated the amount of water vapour carried by the gases at this point would be much increased and the temperature of the gases there might well, owing to the higher saturation, be easily controlled to be comparatively little below 100° C. Under these conditions unit weight of gases take more heat away from the system at the said point than in the older system both on account of this higher outlet temperature, and on account of the higher specific heat of the mixture; but on the other hand owing to the smaller quantity of gases passed from the system and the smaller quantity of dust lost, the economy obtained by the newer system according to the present invention remains substantial.

Installation of Figures 3 to 6 may now be considered. In these figures the same references as are used in Figures 1 and 2 indicate like parts.

In Figures 3 and 4 it will be observed the gases after they leave the cyclone separators (from which latter the deposited dust is continuously withdrawn along a trunk 108 by a conveyor 118) pass in part to the washing tower to leave the system as before and the portion which is to be circulated divides into two currents the one of which passes the damper 24 as before and flows along the branch 52 into the drying duct directly along with the make-up gas supplied through the pipe 44 to constitute the current into which the wet material is introduced at 12 and the other of which flows along a branch 54, and passing through a duct 56, enters the drying duct through a slit or slits 58 extending along the bottom of the duct.

The reduced pressure prevailing at this portion of the duct 2 causes a distinct blast action to be exerted by this current or these currents of entering gas, and material which may have failed to remain suspended in the gas current is thus once more thrown up into it.

In the construction shown in Figures 5 and 6 purely mechanical means is shown as employed there being in the same section of the drying duct a sunken portion 60 into which any material dropping from the gas current falls to be acted upon by a conveyor of suitable type shown as of ordinary worm type 62 which acts to convey out of the apparatus along a pipe terminating at 64 any deposited material which the gas current cannot take up, the deterioration of this latter material by sustained contact with the higher temperature gas current at the inlet end of the drying system being thus guarded against.

What I claim as my invention and desire to secure by Letters Patent is:

1. A process of drying solid materials wherein the same is carried in a comparatively finely-divided state by, and in suspension in, a current of hot gaseous products of combustion through a long duct so that the drying is effected during the passage of the material along the duct and by the heat brought into the duct by said gaseous products and wherein the material is caused to progress along the duct as steadily as possible and without deliberate and marked pause and which is characterized by the fact that the current is mainly composed of gaseous products as aforesaid which have already once passed along the duct in functioning as drying medium.

2. In the drying of solid combustible or other materials in suspension in and by a current of hot gaseous products of combustion exhausting a portion only of the current cooled by drying of solid material and circulating the remainder to use it (after the addition thereto of fresh gaseous products of combustion to replace those exhausted from the system and after reheating thereof by hot gaseous products of combustion in a heat interchanger) for further drying in suspension as aforesaid.

3. A process according to claim No. 1 wherein a combustible material is dried as aforesaid and the material, dried to the desired extent, is separated from the current by cyclone separating means from which a part of the current returns to the duct and another part passes to gas-washing means before leaving the system.

4. A drying installation operating according to the process claimed in claim No. 1 and having means to ensure the maintenance of a pressure below that of the atmosphere at a point in the duct where fresh gaseous products are introduced into the system.

5. A drying installation wherein the material is dried by suspension thereof in and by a current of hot gas travelling along a duct and which installation comprises material-shifting means acting at a location along the duct where the material-carrying power of the current is insufficient.

6. A drying installation wherein the material is dried by suspension thereof in and by a current of hot gas travelling along a duct and wherein at a location along the duct where the material-carrying power of the current is insufficient, material which the current fails to maintain suspended is projected anew into the current by an auxiliary blast of gas which is added to the main current at said location.

7. A drying installation comprising a duct, a dust-extracting device into which the duct leads, a fan connected to the duct to create a flow of gas through the same into said device, an inlet opening in the duct at a point along the same relatively remote from the said device, and means for automatically re-introducing into said flow of gas material deposited from said flow of gas at a locality between the said inlet opening and said device.

In testimony whereof I affix my signature.

THOMAS RIGBY.